United States Patent
Jang et al.

(10) Patent No.: US 11,525,192 B2
(45) Date of Patent: Dec. 13, 2022

(54) METHOD FOR MANUFACTURING WHOLLY AROMATIC LIQUID-CRYSTALLINE POLYESTER FIBER WITH ENHANCED SPINNABILITY

(71) Applicant: SEYANG POLYMER, Incheon (KR)

(72) Inventors: Sun Hwa Jang, Yongin-si (KR); Tae-Young Ha, Incheon (KR); Sung-Eun Kim, Cheonan-si (KR); Youn Eung Lee, Daejeon (KR)

(73) Assignee: SEYANG POLYMER, Incheon (KR)

( * ) Notice: Subject to any disclaimer, the term of this patent is extended or adjusted under 35 U.S.C. 154(b) by 288 days.

(21) Appl. No.: 16/771,257

(22) PCT Filed: Nov. 18, 2019

(86) PCT No.: PCT/KR2019/015774
§ 371 (c)(1),
(2) Date: Jun. 10, 2020

(87) PCT Pub. No.: WO2020/111619
PCT Pub. Date: Jun. 4, 2020

(65) Prior Publication Data
US 2020/0370205 A1    Nov. 26, 2020

(30) Foreign Application Priority Data
Nov. 29, 2018 (KR) .................. 10-2018-0150266

(51) Int. Cl.
| | | |
|---|---|---|
| *D01F 6/62* | (2006.01) | |
| *C08G 63/183* | (2006.01) | |
| *C08G 63/195* | (2006.01) | |
| *C08G 63/80* | (2006.01) | |
| *D01D 5/08* | (2006.01) | |
| *D01D 10/02* | (2006.01) | |
| *D01F 6/84* | (2006.01) | |

(52) U.S. Cl.
CPC ............. *D01F 6/62* (2013.01); *C08G 63/183* (2013.01); *C08G 63/195* (2013.01); *C08G 63/80* (2013.01); *D01D 5/08* (2013.01); *D01D 10/02* (2013.01); *D01F 6/84* (2013.01); *C08G 2250/00* (2013.01)

(58) Field of Classification Search
USPC .............. 528/190, 193, 194, 271, 272, 274; 428/364
See application file for complete search history.

(56) References Cited

FOREIGN PATENT DOCUMENTS

| | | | |
|---|---|---|---|
| JP | 2012-92171 A | 5/2012 | |
| KR | 10-2015-0079071 A | 7/2015 | |
| KR | 10-2015-0079072 A | 7/2015 | |
| KR | 20150079071 A * | 7/2015 | ............... D01F 6/62 |
| KR | 10-2018-0106669 A | 10/2018 | |

OTHER PUBLICATIONS

KR20150079071A machine translation: Jang Seon Hwang et al. ; Wholly aromatic liquid crystalline polyester fiber and method for manufacturing the same; (Year: 2015).*

* cited by examiner

*Primary Examiner* — Terressa Boykin
(74) *Attorney, Agent, or Firm* — Goldilocks Zone IP Law

(57) ABSTRACT

The present invention relates to a method for manufacturing a wholly aromatic liquid-crystalline polyester fiber with enhanced spinnability, and more specifically, to a method for manufacturing a wholly aromatic liquid-crystalline polyester fiber including: pelletizing a resin manufactured by adding 1.08 equivalents to 1.12 equivalents of acetic anhydride to raw material monomers including hydroxy benzoic acid, hydroxy naphthoic acid, biphenol, terephthalic acid, and isophthalic acid, followed by solid-phase polycondensation, and melt-spinning under oil conditions in which winding-up improving oil is diluted to 0.5% to 2% and silicone spinning oil for high temperature is diluted to 0.5% to 2%, respectively, with water as a solvent.

9 Claims, 1 Drawing Sheet

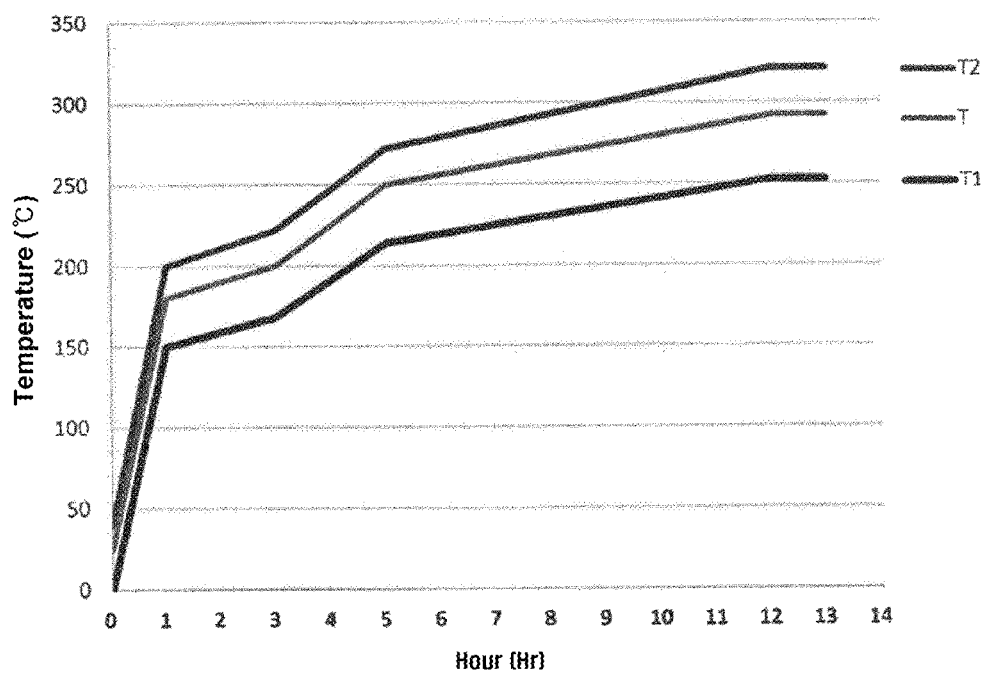

METHOD FOR MANUFACTURING WHOLLY AROMATIC LIQUID-CRYSTALLINE POLYESTER FIBER WITH ENHANCED SPINNABILITY

CROSS REFERENCE TO RELATED PATENT APPLICATIONS

This application claims priority to and the benefit under 35 U.S.C. Section 371, of PCT International Application No. PCT/KR2019/015774, filed Nov. 18, 2019, which claimed priority to Korean Patent Application No. 10-2018-0150266, filed on Nov. 29, 2018, the disclosure of which is incorporated herein by reference in its entirety.

TECHNICAL FIELD

The present invention relates to a method for manufacturing a wholly aromatic liquid-crystalline polyester fiber, and more specifically, to a method for manufacturing a wholly aromatic liquid-crystalline polyester fiber manufactured by polycondensing raw material monomers including hydroxy benzoic acid, hydroxy naphthoic acid, biphenol, terephthalic acid, and isophthalic acid, together with 1.08 equivalents to 1.12 equivalents of acetic anhydride.

BACKGROUND ART

A wholly aromatic liquid-crystalline polyester resin is characterized by having a rigid molecule, forming a liquid crystal state without entanglement between molecules even in a molten state, and exhibiting a behavior in which the molecular chains are oriented in a flow direction by shearing force during molding. Due to a structure composed of layers including molecules oriented in the flow direction, the wholly aromatic liquid-crystalline polyester resin has high strength, high elastic modulus, high heat resistance, and low coefficient of expansion. In addition, the wholly aromatic liquid-crystalline polyester resin may have a specific chemical structure to provide excellent chemical resistance and low moisture absorption. In addition, a main chain of the wholly aromatic liquid-crystalline polyester resin is composed of repeating units derived from a mesogenic monomer, and the rigid structure of the main chain increases a melting point and enhances strength and elasticity. Due to these characteristics, the wholly aromatic liquid-crystalline polyester resin is widely used as materials for small precision molded products and electrical and electronic components.

This wholly aromatic liquid-crystalline polyester resin is generally processed and used by injection molding. In addition to the materials for the small precision molded products or electrical and electronic components as described above, the wholly aromatic liquid-crystalline polyester resin is required to be processed by extrusion spinning rather than injection molding in order to apply the wholly aromatic liquid-crystalline polyester resin to various applications such as ropes, industrial safety gloves, industrial cables, sports goods, underwater cable coating, nets, belts for high heat transfer, felt for shrink proofing and calendar, lightweight interior and exterior composite materials for aviation/space and automobiles, and the like. However, the conventional wholly aromatic liquid-crystalline polyester fiber obtained by fiberizing the conventional wholly aromatic liquid-crystalline polyester resin, for example, the conventional wholly aromatic liquid-crystalline polyester fiber including only repeating units derived from hydroxy benzoic acid and repeating units derived from hydroxy naphthoic acid, has a low melting temperature, such that a heat treatment reaching temperature cannot be sufficiently high. Further, when heat treatment is performed by raising a temperature using a conventional heating method, there is a problem that it is difficult to perform a high-temperature heat treatment since melt adhesion between fibers occurs. Since it is difficult to heat-treat the fiber at a high temperature, the conventional wholly aromatic liquid-crystalline polyester fibers do not have sufficiently excellent strength, elongation, and elastic modulus, and the like, to be applied to various applications as described above, is expensive, and has limitations for use in general industrial purposes.

In order to solve the above-described problems, Korean Patent Laid-Open Publication No. 2015-0079071 and No. 2015-0079072 disclose that strength, elongation, and elastic modulus are improved by polycondensing raw material monomers including hydroxy benzoic acid, hydroxy naphthoic acid, biphenol, terephthalic acid, and isophthalic acid to manufacture a wholly aromatic liquid-crystalline polyester fiber.

However, in the case of products manufactured from the above-described cited patents, since the degree of polymerization does not increase to a sufficient level, melt viscosity is low and spinnability of the resin is poor at high temperature, and thus there is a problem to be used as an actual fiber. Accordingly, in the case of spinning with a small-scale laboratory spinning machine, spinning is partially possible, but in the case of spinning with a mass-production level spinning machine, it has been difficult to be practically commercialized since the spinning does not proceed properly. Further, since physical properties are not greatly improved in the heat treatment process, it is also required to further improve strength, elongation, and elastic modulus, and thus there is a still need to develop a lot of researches.

DISCLOSURE

Technical Problem

An object of the present invention is to provide a method for manufacturing a wholly aromatic liquid-crystalline polyester fiber having excellent strength, elongation, elastic modulus, and spinnability.

Technical Solution

In one general aspect, a method for manufacturing a wholly aromatic liquid-crystalline polyester fiber includes: performing acetylation reaction by stirring raw material monomers including hydroxy benzoic acid, hydroxy naphthoic acid, biphenol, terephthalic acid, and isophthalic acid, and adding a reactive solvent thereto together with an organic catalyst or an inorganic catalyst (Step A); manufacturing a prepolymer by heating to perform an esterification reaction and polycondensation after performing the acetylation reaction (Step B); manufacturing a polyester resin by solid-phase polycondensation of the prepolymer (Step C); manufacturing wholly aromatic liquid-crystalline polyester resin pellets by extruding the polyester resin (Step D); manufacturing a wholly aromatic liquid-crystalline polyester fiber by melt-spinning the pellets (Step E); and heat-treating the fiber through a plurality of heating steps (Step F), wherein in Step A, 1.08 equivalent to 1.12 equivalents of acetic anhydride is added as the reactive solvent.

The plurality of heating steps in Step F may include: a first step of heating from a first temperature $T_1$ to a second temperature $T_2$ at a first heating rate $V_1$; a second step of heating from the second temperature $T_2$ to a third temperature $T_3$ at a second heating rate $V_2$; a third step of heating from the third temperature $T_3$ to a fourth temperature $T_4$ at a third heating rate $V_3$; a fourth step of heating from the fourth temperature $T_4$ to a fifth temperature $T_5$ at a fourth heating rate $V_4$; and a fifth step of maintaining the fifth temperature $T_5$ for 1 hour or more.

When a melting temperature of the wholly aromatic liquid-crystalline polyester fiber is Tm and a temperature at which polymerization of the fiber is initiated is Ts, $T_1$ may be room temperature; Ts−30° C.≤$T_2$≤Ts−20° C.; Ts° C.≤$T_3$≤Ts+10° C.; Tm−50° C.≤$T_4$≤Tm−30° C.; Tm−10° C.≤$T_5$≤Tm; 0.15° C./min≤$V_2$≤0.3° C./min; and 0.05° C./min≤$V_4$<0.15° C./min.

When in the plurality of heating steps, a slope of temperature change over time in step x is $a_x$ and the minimum T-intercept value in step x is $b_x$ (1≤x≤5), a heat treatment temperature T may satisfy the following relationships, in the first step, $a_1t+b_1$≤T≤$a_1t+b_1+40$ (150≤$a_1$≤160, $b_1$=0, 0≤t≤1); in the second step, $a_2t+b_2$≤T≤$a_2t+b_2+40$ (9≤$a_2$≤11, 141≤$b_2$≤149, 1≤t≤3); in the third step, $a_3t+b_3$≤T≤$a_3t+b_3+40$ (23≤$a_3$≤25, 99≤$b_3$<107, 3≤t≤5); in the fourth step, $a_4t+b_4$≤T≤$a_4t+b_4+40$ (5.5≤$a_4$≤6.5, 186.5≤$b_4$≤199.5, 5≤t≤12); and in the fifth step, $a_5t+b_5$≤T≤$a_5t+b_5+40$ ($a_5$=0, 252.5≤$b_5$≤277.5, 12≤t≤13).

The melt-spinning in step E may be performed by using a spinning nozzle under the following conditions of 3≤L/D≤5; and 0.15 mm≤D≤0.3 mm, wherein a diameter of the spinning nozzle is D and a length of the spinning nozzle is L.

The acetylation reaction in step A may be performed at 120° C. to 150° C.

The prepolymer may be synthesized by performing an esterification reaction at a temperature of 310° C. to 340° C. for 5 to 8 hours in Step B.

The solid-phase polycondensation in Step C may be performed at 265° C. to 280° C.

The extruding in Step D may be performed at a temperature of 300° C. to 340° C.

The melt-spinning in Step E may be performed under oil conditions in which winding-up improving oil is diluted to 0.5% to 2% and silicone spinning oil for high temperature is diluted to 0.5% to 2%, respectively, with water as a solvent.

Advantageous Effects

The present invention provides a method for manufacturing a liquid-crystalline polyester fiber having enhanced spinnability and physical properties by polycondensing raw material monomers including hydroxy benzoic acid, hydroxy naphthoic acid, biphenol, terephthalic acid, and isophthalic acid, together with 1.08 equivalents to 1.12 equivalents of acetic anhydride.

DESCRIPTION OF DRAWINGS

FIG. 1 shows a time-temperature graph of a heat treatment process in step F of the present invention (T1 is a graph with the minimum slope and the minimum T intercept, T2 is a graph with the maximum slope and the maximum T intercept, and T is a graph of Example).

DETAILED DESCRIPTION OF EMBODIMENT

Hereinafter, the present invention will be described in more detail.

A method for manufacturing a liquid-crystalline polyester fiber according to an embodiment of the present invention includes: performing acetylation reaction by stirring hydroxy benzoic acid, hydroxy naphthoic acid, biphenol, terephthalic acid, and isophthalic acid, and adding a reactive solvent thereto together with an organic catalyst or an inorganic catalyst (Step A); manufacturing a prepolymer by heating to perform esterification and polycondensation reactions after performing the acetylation reaction (Step B); manufacturing a polyester resin by solid-phase polycondensation of the prepolymer (Step C); manufacturing wholly aromatic liquid-crystalline polyester resin pellets by extruding the polyester resin (Step D); manufacturing a wholly aromatic liquid-crystalline polyester fiber by melt-spinning the pellets (Step E); and heat-treating the fiber through a plurality of heating steps (Step F).

Step A is to perform the acetylation reaction by stirring hydroxy benzoic acid, hydroxy naphthoic acid, biphenol, terephthalic acid, and isophthalic acid, and adding the reactive solvent thereto together with an organic catalyst or an inorganic catalyst.

Here, it is preferable that molar ratios of the hydroxy benzoic acid, hydroxy naphthoic acid, biphenol, terephthalic acid, and isophthalic acid, i.e., n(a), n(b), n(c), n(d), and n(e), respectively, satisfy the following conditions:

$60<n(a)<70;$ $1<n(b)<10;$ $10<n(c)<20;$ $5<n(d)<15;$ and $1<n(e)<10.$

The hydroxy benzoic acid may include one or more selected from the group consisting of 4-hydroxy benzoic acid, 3-hydroxy benzoic acid, 2-hydroxy benzoic acid and combinations thereof.

In addition, the hydroxy naphthoic acid may include one or more selected from the group consisting of 6-hydroxy-2-naphthoic acid, 2-hydroxy-6-naphthoic acid, 3-hydroxy-2-naphthoic acid, 2-hydroxy-1-naphthoic acid, 1-hydroxy-2-naphthoic acid, and combinations thereof.

The acetylation reaction is a step of first converting a hydroxyl group to an acetyl group in order to facilitate the polymer polycondensation of the esterification reaction at a much lower temperature without side reactions. When the esterification reaction is performed without conversion to the acetyl group, more energy and time are required, and a lot of side reactions may be performed.

The acetylation reaction in step A is preferable to be performed at 120° C. to 150° C.

When the acetylation reaction is performed at a temperature below 120° C., acetic anhydride is not well refluxed, and thus hydroxy groups that are not converted remain, which may cause side reactions. When the acetylation reaction is performed at a temperature exceeding 150° C., it is not preferable since side reactions such as a decarbonation reaction may occur.

The reactive solvent for the acetylation reaction is preferable to include at least one compound selected from the group consisting of acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, and β-bromopropionic anhydride, but it is not necessarily limited thereto.

As the reactive solvent, acetic anhydride is preferably used in a content of 1.08 equivalents to 1.12 equivalents relative to equivalents of raw material monomers consisting of hydroxy benzoic acid, hydroxy naphthoic acid, biphenol, terephthalic acid, and isophthalic acid, and most preferably, 1.10 equivalents.

When acetic anhydride is used in a content less than the above-described equivalent range, the acetylation reaction does not proceed, and thus sublimates are generated, subsequent polycondensation does not proceed, and residual monomers may occur. Here, when the acetylation reaction does not proceed sufficiently, even if a solid phase polymerization temperature is raised and polymerization time is increased in the following step C, physical properties of the resin are not improved, and even if the heat treatment process is performed in step F, physical properties of the fiber are not significantly improved. In the heat treatment process in step F, fibers are more strongly polymerized to improve strength, elasticity, and the like. Here, when the acetylation reaction does not proceed sufficiently, a corresponding polymerizable functional group is not sufficient, and thus the physical properties are not sufficiently enhanced even if the heat treatment is performed at a high temperature.

Further, when the content of acetic anhydride is less than 1.08, even if it is attempted to increase the degree of polymerization by raising the solid phase polymerization temperature and increasing the time, the degree of polymerization is not increased and the resin has a melt viscosity of 300 poise or less measured at 320° C. At the low viscosity as described above, fibers are cut off during spinning, and when a spinning temperature is increased, carbonization occurs, and thus it is difficult to perform fiberization.

Meanwhile, when the content of acetic anhydride exceeds 1.12, the melt viscosity may be increased, but it is not preferable because acetic anhydride remains on a surface of the resin to generate gas and fibers are cut off during spinning. Further, when acetic anhydride is used in a content exceeding the above equivalent range, it is difficult to control the polymerization rate due to a fast reaction rate, and a lot of effort may be involved in removing the reactive solvent.

It is preferable that the organic catalyst includes at least one compound selected from the group consisting of methylene diphosphonic acid, poly(N-vinylimidazole), imidazole compounds, triazole compounds, dipyridyl compounds, phenanthroline compounds, diazaphenanthroline compounds, 1,5-diazabicyclo[4.3.0]non-5-ene, 1,4-diazabicyclo[2.2.2]octane, and N,N-dimethylaminopyridine.

It is preferable that the inorganic catalyst includes at least one compound selected from the group consisting of sulfuric acid, sodium acetate, magnesium acetate, sodium hydrogen carbonate ($NaHCO_3$), phosphomolybdic acid (PMA), silver trifluoro methanesulfonate (silver triflate), copper perchlorate, and copper (II) sulfate pentahydrate ($CuSO_4.5H_2O$).

It is preferable that the organic catalyst or the inorganic catalyst is added at 0.001 to 0.1 parts by weight based on 100 parts by weight of the total raw material monomers composed of hydroxy benzoic acid, hydroxy naphthoic acid, biphenol, terephthalic acid, and isophthalic acid.

When the organic catalyst or the inorganic catalyst is used in an amount of less than 0.001 parts by weight based on 100 parts by weight of the total amount of raw material monomers, the reaction may not proceed smoothly, and when the organic catalyst or inorganic catalyst is used in an amount exceeding 0.1 parts by weight based on 100 parts by weight of the total amount of raw material monomers, a side reaction such as a decarbonation reaction, or the like, may proceed.

Step B is to manufacture a prepolymer through esterification and polycondensation reactions by heating after performing the acetylation reaction.

In step B, acetic acid generated after the acetylation reaction may be removed by raising a temperature from 300° C. to 330° C. At a temperature below 300° C., reactivity is decreased, and thus esterification does not proceed completely, and at a temperature exceeding 330° C., side reactions may be formed.

The esterification reaction step may be performed up to a temperature range of 310 to 340° C. for 5 to 8 hours.

When the temperature and the time are included, respectively, within the above ranges, a discharge process obstacle does not occur after the polycondensation reaction, and a prepolymer having physical properties that are suitable for the solid-phase polycondensation reaction may be obtained.

Step C is to manufacture a polyester resin by solid-phase polycondensation of the prepolymer manufactured in Step B.

The prepolymer is discharged from a reactor, cooled, and atomized, followed by solid-phase polycondensation to manufacture the polyester resin.

A temperature for the solid-phase polycondensation is preferably 265° C. to 280° C. In the case of polycondensation at a temperature below 260° C., the melt viscosity of the resin is not increased to a sufficient level, and the spinning of the resin hardly proceeds. On the other hand, at 260° C., even though the spinning proceeds to some extent, a discharge amount between holes is uneven and the spinnability is lowered. When the temperature for the solid-phase polycondensation is 265° C. or higher, a sufficient level of resin melt viscosity may be obtained, and spinnability is also good. Meanwhile, when the temperature for the solid phase polycondensation exceeds 280° C., physical properties of the resin may be deteriorated.

The step C of manufacturing the polyester resin may further include a step of pulverizing the prepolymer.

The pulverized prepolymer may have a particle size of, for example, 0.5 mm to 2.5 mm.

The pulverization of the prepolymer may be performed using a pulverizer (e.g., Feather Mill) equipped with a screen having a mesh size of 0.5 mm to 2.5 mm.

Further, a step of cooling the prepolymer before the step of pulverizing the prepolymer may be further included.

In the step of cooling the prepolymer, the prepolymer may be cooled to a temperature of 20 to 70° C., and thus the step of pulverizing the prepolymer may be performed while maintaining the prepolymer at a temperature of 20 to 70° C.

Step D is to manufacture the wholly aromatic liquid-crystalline polyester resin pellets by extruding the polyester resin manufactured in step C.

The extruding step is a process for removing unreacted monomers remaining in the polyester resin and gas generated as by-products and for smooth entrance into the spinning facility.

Step E is to manufacture a wholly aromatic liquid-crystalline polyester fiber by melt-spinning the wholly aromatic liquid-crystalline polyester resin pellets manufactured in step C.

In proceeding the melt-spinning, it is preferable to perform under oil conditions in which winding-up improving oil is diluted to 0.5% to 2% and silicone spinning oil for high temperature is diluted to 0.5% to 2%, respectively, with water as a solvent. More preferably, the melt-spinning may be performed under oil conditions in which winding-up improving oil is diluted to about 1% and silicone spinning oil for high temperature is diluted to about 1%, respectively, with water as a solvent. As the winding-up improving oil, SPINTEX TP-650N manufactured by ICI Woobang Co., Ltd. may be used. In general, the melt-spinning is performed under one oil condition. When the melt-spinning is performed under a condition in which SPINTEX TP-650N is diluted to 5% with water as a solvent, rewinding is possible since winding property of the fiber during spinning is good, but fusion between fibers occurs in the heat treatment process. On the other hand, when the melt-spinning is performed under a condition in which the silicone spinning oil for high temperature is diluted to 2% with water as a solvent, fusion between fibers does not occur in the heat treatment process, but rewinding is not possible since the winding property of the fiber is deteriorated.

Meanwhile, when spinning is performed under an oil condition in which 0.5% to 2% of the winding-up improving oil and 0.5% to 2% of the silicone spinning oil for high temperature are mixed with water as a solvent, rewinding is possible since the fiber has good winding property while fusion between fibers does not occur in the heat treatment, and thus it is possible to manufacture high-quality fibers. In addition, when the content of the oil is outside the range, physical properties of the fiber are deteriorated.

Here, it is preferable that the melt-spinning is performed by using a spinning nozzle under the following conditions of $3 \leq L/D \leq 5$ and $0.15 \text{ mm} \leq D \leq 0.3 \text{ mm}$ when a diameter of the spinning nozzle is D and a length of the spinning nozzle is L.

The smaller the hole size of the spinning nozzle, the better the fiber quality and function. When the diameter D of the spinning nozzle exceeds 0.3 mm, it is not desirable since quality of the fibers is greatly deteriorated. On the other hand, when the diameter of the spinning nozzle is less than 0.15 mm, the hole of the nozzle is excessively small, and thus in the spinning process, hole clogging of the fiber may occur.

Further, when the length of the spinning nozzle is less than three times the length of the diameter, since the length of the nozzle is excessively short, the fiber may not be pressured for a sufficient period of time, and thus it is difficult to take a desired type of fiber. Meanwhile, when the length of the spinning nozzle exceeds 5 times the length of the diameter, the fiber is pressured for an excessively long time, and the residence time in the nozzle is prolonged, and thus the fiber may be carbonized inside the nozzle. Due to the carbonization, hole clogging of the nozzle may be generated, and thus the spinning may be difficult to be processed.

It is preferable that the melt-spinning is performed at a rate of 100 to 1500 m/min at 290° C. to 320° C.

Further, when the temperature of the melt-spinning is less than the lower limit of the range, it is not preferable since there are problems in that the resin is not completely melted, and thus the pressure is high and the resin is not released, and the like. When the temperature of the melt-spinning is more than the upper limit of the range, it is not preferable since viscosity is excessively low, and thus a shape of the fiber after spinning is not maintained but the fiber is thermally decomposed, causing problems such as deterioration of physical properties, and the like.

Further, when the rate of the melt-spinning is less than the lower limit of the range, it is not preferable since there are problems in that the fiber does not receive a tension, straightness is decreased, and the diameter is not maintained uniformly, and the like. When the rate of the melt-spinning is more than the upper limit of the range, it is not preferable since there are problems in that a single yarn of the fiber may occur, and the like.

FIG. 1 illustrates a heat treatment process in step F.

Step F is to heat-treat the wholly aromatic liquid-crystalline polyester fiber manufactured in step E through a plurality of heating steps.

The heating steps in Step F include: a first step of heating from a first temperature $T_1$ to a second temperature $T_2$ at a first heating rate $V_1$; a second step of heating from the second temperature $T_2$ to a third temperature $T_3$ at a second heating rate $V_2$; a third step of heating from the third temperature $T_3$ to a fourth temperature $T_4$ at a third heating rate $V_3$; a fourth step of heating from the fourth temperature $T_4$ to a fifth temperature $T_5$ at a fourth heating rate $V_4$; and a fifth step of maintaining the fifth temperature $T_5$ for 1 hour or more.

In the above-described temperature, it is preferable that when a melting temperature of the wholly aromatic liquid-crystalline polyester fiber is Tm and a temperature at which polymerization of the fiber is initiated is Ts, T1 is room temperature, $Ts-30° C. \leq T_2 \leq Ts-20° C.$, $Ts° C. \leq T_3 \leq Ts+10° C.$, $Tm-50° C. \leq T_4 \leq Tm-30° C.$, and $Tm-10° C. \leq T_5 \leq Tm$.

Further, the heating rate is preferably $0.15° C./min \leq V_2 \leq 0.3° C./min$, $0.05° C./min \leq V_4 < 0.15° C./min$, and $V_1$ and $V_3$ are not particularly limited, but are preferably faster than $V_2$.

The first step corresponds to a process of rapidly raising the temperature in order to heat to the final reaching temperature. Even if the temperature is rapidly raised up to the temperature ranging from Ts−30° C. to Ts−20° C., physical properties of the fiber are not affected. The fiber heated through the first step is slowly heated through the second step.

A temperature at which the second step is initiated is a temperature at which substantial polymerization reaction is initiated. The Ts is about 200° C. In the second step, the temperature is raised at a rate of 0.15° C./min to 0.3° C./min. The reason for raising the temperature slowly as above is to evenly raise the temperature even inside the fiber. When the temperature is rapidly raised, the temperature outside of the fiber is raised, but the temperature inside is not raised sufficiently. When the temperature inside is not evenly distributed as described above, pores may occur in the fiber, thereby deteriorating physical properties.

The third step is to rapidly raise the temperature to near the melting temperature before the actual heat treatment. A third heating rate, which is a heating rate of the third step, is preferably faster than the second heating rate. It is preferable that the third step is performed at a rate of about 0.3° C./min to 0.5° C./min. When the step is performed extremely quickly, a temperature difference between inside and outside may be generated even though the process of evenly distributing the temperature even the inside the fiber has been previously performed. It is necessary to rapidly perform the third step for efficient process progress to the extent that the temperature difference between inside and outside is not large.

The fourth step is a process of actual heat treatment, and it is preferable that a temperature is preferably Tm−10° C. to Tm, and a heating rate is 0.05° C./min or more and less than 0.15° C./min. When the fourth temperature exceeds Tm, the fiber may be melted and fused, and when the fourth temperature is below Tm−10° C., the actual heat treatment does not proceed well, and thus it is not possible to obtain desired physical properties such as strength, elasticity, and the like. In addition, the fourth step is a heating process that proceeds near the melting temperature, and thus when the temperature is changed by the heating rate of 0.15° C./min or more, the fibers are partially melted and interlocked. Meanwhile, adjusting the heating rate to less than 0.05° C./min does not have an excellent effect, and a reaction process time is increased, and thus economic efficiency is poor.

In an embodiment of the present invention, in the case where the heat treatment conditions in step F are expressed as a function, when in the plurality of heating steps, a slope of temperature change over time in step x is ax and the minimum T-intercept value in step x is bx (1≤x≤5), a heat treatment temperature T may be expressed by the following relationships, in the first step, $a_1t+b_1 \leq T \leq a_1t+b_1+40$ ($150 \leq a_1 \leq 160$, $b_1=0$, $0 \leq t \leq 1$); in the second step, $a_1t+b_2 \leq T \leq a_2t+b_2+40$ ($9 \leq a_2 \leq 11$, $141 \leq b_2 \leq 149$, $1 \leq t \leq 3$); in the third step, $a_3t+b_3 \leq T \leq a_3t+b_3+40$ ($23 \leq a_3 \leq 25$, $99 \leq b_3 \leq 107$, $3 \leq t \leq 5$); in the fourth step, $a_4t+b_4 \leq T \leq a_4t+b_4+40$ ($5.5 \leq a_4 \leq 6.5$, $186.5 \leq b_4 \leq 199.5$, $5 \leq t \leq 12$); and in the fifth step, $a_5t+b_5 \leq T \leq a_5t+b_5+40$ ($a_5=0$, $252.5 \leq b_5 \leq 277.5$, $12 \leq t \leq 13$).

The graph drawn through the above function has a relatively gentle slope in the second step in which the actual polymerization reaction is initiated and the fourth step in which the actual heat treatment proceeds. By slowly raising the temperature in the second step, the temperature is evenly distributed to the inside of the fiber, and thus pores may not be generated in the fiber. In addition, it is possible to prevent the fusion of fibers from occurring by the slowest progress of the fourth step process in which the actual heat treatment is performed, in the entire process.

A graph of temperature control section according to the present invention may be moved between the upper limit $T_2$ and the lower limit $T_1$. The graph showing the lower limit has the minimum slope and the minimum T-intercept, and the graph showing the upper limit has the maximum slope and the maximum T-intercept. Embodiments of the present invention are distributed within the scope of the heat treatment temperature control process of the present invention.

Accordingly, when the wholly aromatic liquid-crystalline polyester fiber is manufactured according to the heat treatment temperature control process of the present invention, it is possible to manufacture the wholly aromatic liquid-crystalline polyester fiber having excellent strength, elongation, and elastic modulus through optimum temperature control.

When heating by subdividing the heat treatment process in step F with the plurality of heating steps as described above, it is possible to prevent the wholly aromatic liquid-crystalline polyester fiber from being discolored by rapid heating, it is possible to gradually change physical properties of the wholly aromatic liquid-crystalline polyester fiber, thereby preventing the wholly aromatic liquid-crystal polyester fibers from melting and interlocking with each other, and thus a temperature at which the heat treatment is reached may be increased to a temperature nearly close to or equal to the melting temperature, thereby heat-treating the wholly aromatic liquid-crystalline polyester fiber at a higher temperature.

As described above, when the acetylation proceeds sufficiently with an appropriate content of acetic anhydride, the number of sites where the fibers are capable of being polymerized during heat treatment is increased. Here, as the heat treatment proceeds at a high temperature, the polymerization at the polymerizable site is efficiently performed. That is, by adjusting the content of acetic anhydride and the heat treatment rate, it is possible to greatly improve physical properties such as strength, elasticity, and the like, of fibers during heat treatment.

Meanwhile, the step F may be performed in a nitrogen atmosphere in order to prevent the wholly aromatic liquid-crystalline polyester fiber from being oxidized during heat treatment.

BEST MODE

Hereinafter, specific Examples are provided to help understanding of the present invention. However, the following Examples are merely provided for easier understanding of the present invention, and the contents of the present invention are not limited by these Examples.

EXAMPLE 1

15,000 g (146.9 mol) of acetic anhydride was added to a batch reactor having a capacity of 200 L, and while rotating the stirrer, monomers, i.e., 20,000 g (144.8 mol) of p-hydroxy benzoic acid (HBA), 2,100 g (11.1 mol) of 6-hydroxy-2-naphthoic acid (HNA), 6,220 g (33.4 mol) of biphenol (BP), 3,700 g (22.3 mol) of high purity terephthalic acid (PTA), and 1,850 g (11.1 mol) of high purity isophthalic acid (PIA) were added. Then, 10,000 g (98 mol) of acetic anhydride was further added thereto, and mixed well in the batch reactor. Thereafter, 2.6 g of a potassium acetate catalyst and 10.3 g of a magnesium acetate catalyst were added. After that, an inner space of the reactor was made inert, and then a temperature in the reactor was raised over 1 hour up to a temperature at which acetic anhydride inside the batch reactor was refluxed, and while refluxing at that temperature, hydroxy groups of the monomers were acetylated for 2 hours with acetic anhydride used as an acetylating agent. While removing acetic acid produced in the acetylation reaction and unreacted acetic anhydride obtained by excessive addition, the temperature was raised up to 325° C. at a rate of 0.5° C./min to manufacture a wholly aromatic liquid-crystalline polyester. While being discharged through a lower valve, the manufactured polyester was cooled, solidified, and subjected to primary pulverization to obtain 29,700 g of the polyester. A flow temperature of the primarily pulverized wholly aromatic liquid-crystalline polyester was measured as 249° C. through the CFT-500EX analysis equipment. Subsequently, the primarily pulverized material was subjected to second pulverization using a fine pulverizer, put into a rotary furnace, and while flowing nitrogen at a flow rate of 25 L/min, heated up to 180° C. for 1 hour, maintained at this temperature for 2 hours, and then heated up to 265° C. at a rate of 0.2° C./min and maintained for 3 hours, thereby manufacturing a wholly aromatic liquid-crystalline polyester resin for fibers. Here, in view of physical properties of the obtained wholly aromatic liquid-crystalline polyester resin for fibers, a flow temperature measured by CFT-500EX analysis equipment was 298° C. and a melt viscosity measured at 320° C. by Capillary Rheometer analysis equipment was 635 Poise.

The wholly aromatic liquid-crystalline polyester resin for fibers manufactured as above was pelletized using a twin screw extruder. The pellets thus obtained were dried for 5 hours or more in a 140° C. dryer, and then melt-spun at 320° C. using a spinning nozzle under conditions 0.15 (D)>0.6 (L), L/D=4, with 24 holes. Here, oil in which SPINTEX TP-650N and a silicone spinning oil for high temperature were diluted to 1%, respectively, with water as a solvent, was used as the spinning oil. In this case, rewinding was possible since the as-spun fibers had good winding property, and thus there was no fusion between fibers in the first and second heat treatment processes. The as-spun fibers were wound into a metal tube, put into a sealed furnace, and was subjected to heat-treatment by gradually heating with temperature divided into four steps while flowing nitrogen at 20 L/min. The temperature was raised from room temperature up to about 180° C. for 1 hour, and then in order to prevent fusion between fibers, the temperature was raised at a rate of 0.17° C./min from about 180° C. to about 200° C., raised at a rate of 0.4° C./min from about 200° C. to about 250° C., raised at a rate of 0.1° C./min from about 250° C. to about 290° C., and maintained at about 290° C. for 1 hour, thereby completing the heat treatment. After cooling to room temperature, it was confirmed that no fusion occurred during the heat treatment. Physical properties of the heat-treated fibers were evaluated.

EXAMPLE 2

A wholly aromatic liquid-crystalline polyester resin for fibers was manufactured in the same manner as in Example 1, except that the total content of acetic anhydride added was 24,560 g (240.59 mol). The manufactured resin had a melt viscosity of 544 poise.

In addition, as a result of the spinning in the same manner as in Example 1, some of the fibers were cut off during spinning, but when the spinning was performed by lowering a winding rate, the winding property was good. The obtained as-spun fibers were heat-treated in the same manner as in Example 1, and physical properties thereof were evaluated.

EXAMPLE 3

A wholly aromatic liquid-crystalline polyester resin for fibers was manufactured in the same manner as in Example 1, except that the total content of acetic anhydride added was 25,470 g (249.50 mol). The manufactured resin had a melt viscosity of 953 poise.

In addition, as a result of spinning in the same manner as in Example 1, the fibers were not cut off during spinning, and the winding property was good. The obtained as-spun fibers were heat-treated in the same manner as in Example 1, and physical properties thereof were evaluated.

COMPARATIVE EXAMPLE 1

A wholly aromatic liquid-crystalline polyester resin for fibers was manufactured in the same manner as in Example 1, except that the total content of acetic anhydride added was 25,690 g (251.65 mol). The manufactured resin had a melt viscosity of 800 poise.

In addition, as a result of the spinning in the same manner as in Example 1, there was an acetic acid odor during the spinning, and the fibers were cut off as the gas exploded and were not wound.

COMPARATIVE EXAMPLE 2

Raw material monomers, i.e., 19,500 g (141.2 mol) of p-hydroxy benzoic acid (HBA), 2,040 g (10.9 mol) of 6-hydroxy-2-naphthoic acid (HNA), 6,070 g (32.6 mol) of biphenol (BP), 3,610 g (21.7 mol) of terephthalic acid (PTA), and 1,800 g (10.9 mol) of isophthalic acid (PIA) were added, and 23,510 g (230.2 mol) of acetic anhydride was added thereto, and then mixed well in the batch reactor. Thereafter, 2.4 g of a potassium acetate catalyst was added. After that, an inner space of the reactor was made inert, and then a temperature in the reactor was raised over 1 hour up to a temperature at which acetic anhydride inside the batch reactor was refluxed, and while refluxing at that temperature, hydroxy groups of the monomers were acetylated for 2 hours with acetic anhydride used as an acetylating agent. Then, while removing acetic acid produced in the acetylation reaction and unreacted acetic anhydride obtained by excessive addition, the temperature was raised up to 325° C. over 5 hours and 40 minutes to manufacture a wholly aromatic liquid-crystalline polyester. While being discharged through a lower valve, the polyester was cooled, solidified, and subjected to primary pulverization to obtain 29,700 g of the polyester. A flow temperature of the primarily pulverized wholly aromatic liquid-crystalline polyester was measured as 245° C. through the CFT-500EX analysis equipment. Subsequently, the primarily pulverized material was subjected to second pulverization using a fine pulverizer, put into a rotary furnace, and while flowing nitrogen at a flow rate of 25 L/min, heated up to 250° C., maintained at this temperature for 3 hours, thereby manufacturing a wholly aromatic liquid-crystalline polyester resin. Here, in view of physical properties of the obtained wholly aromatic liquid-crystalline polyester resin for fibers, a flow temperature measured by CFT-500EX analysis equipment was 294° C. and a melt viscosity measured at 320° C. by Capillary Rheometer analysis equipment was 237 Poise.

Then, as a result of pelletizing the wholly aromatic liquid-crystalline polyester resin in the same manner as in Example 1 and spinning the pellets, deviations between nozzle holes occurred, and the fibers were severely cut off and were not wound. Some of the obtained as-spun fibers were put into a sealed furnace, and while flowing nitrogen at 20 L/min, the temperature was raised from room temperature up to 180° C. for 1 hour, and then the temperature was raised from 180° C. to 280° C. over 4 hours, raised from 280° C. to 300° C. over 6 hours, and maintained at 300° C. for 1 hour, thereby completing the heat treatment. After cooling to room temperature, it was confirmed that fusion occurred during the heat treatment. Physical properties of the fibers were evaluated.

COMPARATIVE EXAMPLE 3

The wholly aromatic liquid-crystalline polyester resin for fibers was manufactured in the same manner, except that the temperature of the rotary furnace of Comparative Example 1 was raised up to 265° C. The manufactured resin had a melt viscosity of 271 poise.

In addition, as a result of spinning in the same manner as in Example 1, the fibers were severely cut off and were not wound. Some of the obtained as-spun fibers were heat-treated in the same manner and physical properties thereof were evaluated.

Table 1 below shows comparison in spinnability of the liquid-crystalline polyester resins manufactured according to Examples of the present invention. When acetic anhydride was added in a content of 1.08 to 1.12 equivalents, the fibers were wound without being cut off.

Table 2 below shows comparison in physical properties of the liquid-crystalline polyester resins manufactured according to Examples of the present invention. The physical properties of the resins were measured by CFT-500EX and Capillary Rheometer analysis equipment, which are different from measurement methods of physical properties disclosed in Korean Patent Laid-Open Publication No. 2015-0079091 and No. 2015-0079072.

Therefore, Comparative Example 2 of the present invention had physical property values that were different from those described in KR patent application No. 2015-0079091 even though Comparative Example 2 was manufactured in the same manner as in Example 1 of the above cited KR patent application. Specifically, the Example of the cited KR patent application No. 2015-0079091 showed that the strength was 24 g/den, the elongation was 2.9%, and the elastic modulus was 1050 g/den, but in the present application, the strength was 10.24 g/den, the elongation was 1.54%, and the elastic modulus was 379 g/den. The differences in physical properties as described above are resulted from the differences in the measurement methods.

Accordingly, it could be seen that when the content of acetic anhydride was added in a content of 1.08 equivalents or more, physical properties of the fibers were generally improved.

Further, it could be appreciated from results of Table 2 that in the case where the content of acetic anhydride was 1.08 equivalents or more, when the heat treatment was performed, the strength was increased by about 2.5 times, the elongation was increased by about 1.5 times, and the elastic modulus was increased by about 1.35 times as compared to those before the heat treatment. On the other hand, it could be appreciated that in the case where the content of acetic anhydride was less than 1.08 equivalents,

TABLE 1

|  | Content of acetic anhydride (eq.) | Physical properties of prepolymer (flow temperature, °C.) | Solid phase polymerization conditions (temperature and time) | Physical properties of resin | | Spinnability |
|---|---|---|---|---|---|---|
|  |  |  |  | Melt viscosity (Poise) | Flow temperature (°C.) |  |
| Example 1 | 1.10 | 249 | 265° C., 3 hrs | 635 | 298 | ○ |
| Example 2 | 1.08 | 248 | 265° C., 3 hrs | 544 | 296 | Δ |
| Example 3 | 1.12 | 251 | 265° C., 3 hrs | 953 | 301 | ○ |
| Comparative Example 1 | 1.13 | 251 | 265° C., 3 hrs | 800 | 300 | X |
| Comparative Example 2 | 1.06 | 245 | 250° C., 3 hrs | 237 | 294 | X |
| Comparative Example 3 | 1.06 | 246 | 265° C., 3 hrs | 271 | 296 | X |

Spinnability
○: wound without being cut off
Δ: wound without being cut off when winding rate is lowered.
X: cut off and not wound even when winding rate is lowered.

TABLE 2

|  | As-spun | | | After heat treatment | | |
|---|---|---|---|---|---|---|
|  | Strength (g/den) | Elongation (%) | Elastic modulus @ 1% (g/den) | Strength (g/den) | Elongation (%) | Elastic modulus @ 1% (g/den) |
| Example 1 | 7.35 | 1.65 | 441 | 18.35 | 2.48 | 609 |
| Example 2 | 7.21 | 1.58 | 430 | 17.98 | 2.46 | 591 |
| Example 3 | 7.53 | 1.69 | 472 | 18.20 | 2.47 | 613 |
| Comparative Example 2 | 5.97 | 1.36 | 353 | 10.24 | 1.54 | 379 |
| Comparative Example 3 | 6.03 | 1.39 | 361 | 11.30 | 1.62 | 385 |

As shown in Table 1, when acetic anhydride was added in a content of 1.08 to 1.12 equivalents, it could be confirmed that the fibers were wound without being cut off. In the case where the content thereof was out of the above range, at the time of spinning with a mass-production level spinning machine, the fibers were cut off even when the winding rate was lowered, and some of fibers could be obtained only by spinning with a laboratory spinning machine.

In addition, when comparing physical properties between the fibers obtained in Examples and some fibers obtained in Comparative Examples, i.e., comparing a case where acetic anhydride was added in a content of 1.08 equivalents or more with a case where acetic anhydride was added in a content of less than 1.08 equivalents as shown in Table 2, it could be seen that the strength was improved by about 1.8 times, the elongation was improved by about 1.5 times, and the elastic modulus was improved by about 1.5 times.

when the heat treatment was performed, the strength was increased by about 1.8 times, the elongation was increased by about 1.15 times, and the elastic modulus was increased by about 1.07 times.

It could be confirmed from the above results that when acetic anhydride was added in a content less than 1.08 equivalents, even when the temperature was raised, the degree of polymerization was not increased, and the acetylation was not sufficiently performed, and thus physical properties were not significantly increased even after the heat treatment. As a result, it could be appreciated that when acetic anhydride was added in a content of 1.08 equivalents or more, the strength, elasticity, and tensile strength of the fiber could be greatly improved by the heat treatment process.

In conclusion, when the content of acetic anhydride is adjusted to 1.08 to 1.12 equivalents, the solid-phase polymerization is performed at a temperature of 265° C. to 280° C., the spinning is performed under oil conditions in which winding-up improving oil is diluted to 0.5% to 2% and silicone spinning oil for high temperature is diluted to 0.5% to 2%, respectively, with water as a solvent, using a spinning nozzle having conditions of 3≤L/D≤5 and 0.15 mm≤D≤0.3 mm, followed by the 5-step heat treatment, it is possible to manufacture fibers that are not cut off without fusion due to improved spinnability.

Specifically, when the content of acetic anhydride is adjusted to 1.08 to 1.12 equivalents, the acetylation reaction is capable of being sufficiently performed. When the acetylation reaction is performed as described above, a large amount of polymerizable sites are generated. When the solid-phase polymerization is performed at a temperature of 265° C. to 280° C., the polymerization at the sites is capable of sufficiently increasing the degree of polymerization of the resin and also increasing the melting viscosity. The melt viscosity of the resin is 540 poise or more when measured at 320° C., and the fibers are not cut off when spinning at the melt viscosity as described above. In addition, when the resin is subjected to spinning under oil conditions in which the winding-up improving oil is diluted to 0.5% to 2% and the silicone spinning oil for high temperature is diluted to 0.5% to 2%, respectively, with water as a solvent, rewinding is possible since the fiber has good winding property, and fusion between fibers does not occur. Further, when the resin is subjected to spinning using a spinning nozzle having conditions of 3≤L/D≤5 and 0.15 mm≤D≤0.3 mm, the fibers are not fused and do not carbonized, and thus the fibers are not cut off. When the above-described fibers are heat-treated over 5 steps, the temperature is not changed rapidly, and thus the physical properties of the fibers are enhanced without fusion between the fibers.

What is claimed is:

1. A method for manufacturing a wholly aromatic liquid-crystalline polyester fiber comprising:
    performing acetylation reaction by stirring raw material monomers including hydroxy benzoic acid, hydroxy naphthoic acid, biphenol, terephthalic acid, and isophthalic acid, and adding a reactive solvent thereto together with an organic catalyst or an inorganic catalyst (Step A);
    manufacturing a prepolymer by heating to perform an esterification reaction and polycondensation after performing the acetylation reaction (Step B);
    manufacturing a polyester resin by solid-phase polycondensation of the prepolymer (Step C);
    manufacturing wholly aromatic liquid-crystalline polyester resin pellets by extruding the polyester resin (Step D);
    manufacturing a wholly aromatic liquid-crystalline polyester fiber by melt-spinning the pellets (Step E); and
    heat-treating the fiber through a plurality of heating steps (Step F),
    wherein in Step A, 1.08 equivalent to 1.12 equivalents of acetic anhydride is added as the reactive solvent,
    wherein the melt-spinning in step E is performed by using a spinning nozzle under the following conditions of
    3≤L/D≤5; and
    0.15 mm≤D≤0.3 mm
        wherein a diameter of the spinning nozzle is D and a length of the spinning nozzle is L.

2. A method for manufacturing a wholly aromatic liquid-crystalline polyester fiber comprising:
    performing acetylation reaction by stirring raw material monomers including hydroxy benzoic acid hydroxy naphthoic acid, biphenol, terephthalic acid, and isophthalic acid, and adding a reactive solvent thereto together with an organic catalyst or an inorganic catalyst (Step A);
    manufacturing a prepolymer by heating to perform an esterification reaction and polycondensation after performing the acetylation reaction (Step B);
    manufacturing a polyester resin by solid-phase polycondensation of the prepolymer (Step C);
    manufacturing wholly aromatic liquid-crystalline polyester resin pellets by extruding the polyester resin (Step D),
    manufacturing a wholly aromatic liquid-crystalline polyester fiber by melt-spinning the pellets (Step E); and
    heat-treating the fiber through a plurality of heating steps (Step F),
    wherein in Step A, 1.08 equivalent to 1.12 equivalents of acetic anhydride is added as the reactive solvent, wherein
    the plurality of heating steps in Step F include:
    a first step of heating from a first temperature $T_1$ to a second temperature $T_2$ at a first heating rate $V_1$;
    a second step of heating from the second temperature $T_2$ to a third temperature $T_3$ at a second heating rate $V_2$;
    a third step of heating from the third temperature $T_3$ to a fourth temperature $T_4$ at a third heating rate $V_3$;
    a fourth step of heating from the fourth temperature $T_4$ to a fifth temperature $T_5$ at a fourth heating rate $V_4$, and
    a fifth step of maintaining the fifth temperature $T_5$ for 1 hour or more.

3. The method of claim 2, wherein
when a melting temperature of the wholly aromatic liquid-crystalline polyester fiber is Tm and a temperature at which polymerization of the fiber is initiated is Ts,
$T_1$ is room temperature;
Ts−30° C.≤$T_2$≤Ts−20° C.;
Ts° C.≤$T_3$≤Ts+10° C.;
Tm−50° C.≤$T_4$≤Tm−30° C.;
Tm−10° C.≤$T_5$≤Tm;
0.15° C./min≤$V_2$≤0.3° C./min; and
0.05° C./min≤$V_4$<0.15° C./min.

4. The method of claim 2, wherein
when in the plurality of heating steps, a slope of temperature change over time in step x is $a_x$ and the minimum T-intercept value in step x is $b_x$ (1≤x≤5),
a heat treatment temperature T satisfies the following relationships,
in the first step, $a_1 t+b_1 \leq T \leq a_1 t+b_1+40$ (150≤$a_1$≤160, $b_1$=0, 0≤t≤1);
in the second step, $a_1 t+b_2 \leq T \leq a_2 t+b_2+40$ (9≤$a_2$≤11, 141≤$b_2$≤149, 1≤t≤3);
in the third step, $a_3 t+b_3 \leq T \leq a_3 t+b_3+40$ (23≤$a_3$≤25, 99≤$b_3$≤107, 3≤t≤5);
in the fourth step, $a_4 t+b_4 \leq T \leq a_4 t+b_4+40$ (5.5≤$a_4$≤6.5, 186.5≤$b_4$≤199.5, 5≤t≤12);
in the fifth step, $a_5 t+b_5 \leq T \leq a_5 t+b_5+40$ ($a_5$=0, 252.5≤$b_5$≤277.5, 12≤t≤13).

5. The method of claim 1, wherein the acetylation reaction in Step A is performed at 120° C. to 150° C.

6. The method of claim 1, wherein the prepolymer is synthesized by performing an esterification reaction at a temperature of 310° C. to 340° C. for 5 to 8 hours in Step B.

7. The method of claim 1, wherein the solid-phase polycondensation in Step C is performed at 265° C. to 280° C.

8. The method of claim 1, wherein the extruding in Step D is performed at a temperature of 300° C. to 340° C.

9. The method of claim 1, wherein the melt-spinning in Step E is performed under oil conditions in which winding-up improving oil is diluted to 0.5% to 2% and silicone spinning oil for high temperature is diluted to 0.5% to 2%, respectively, with water as a solvent.

* * * * *